United States Patent [19]

Flickner

[11] Patent Number: 5,345,267
[45] Date of Patent: Sep. 6, 1994

[54] AKB APPARATUS WITH HOT START FLASH PREVENTION

[75] Inventor: Andrew K. Flickner, Indianapolis, Ind.

[73] Assignee: Thomson Consumer Electronics, Inc., Indianapolis, Ind.

[21] Appl. No.: 114,867

[22] Filed: Aug. 31, 1993

[51] Int. Cl.$^5$ .............................................. H04N 5/68
[52] U.S. Cl. ...................... 348/379; 348/380
[58] Field of Search ............... 348/379, 380, 377, 730, 348/725, 805, 776, 809, 808, 635, 637, 687, 689, 677, 679, 678; 315/383; 307/263, 268; H04N 5/59, 5/57, 5/44, 5/68, 9/18, 9/20

[56] References Cited

U.S. PATENT DOCUMENTS

| | | | |
|---|---|---|---|
| 4,450,476 | 5/1984 | Tallant, II | 358/74 |
| 4,562,479 | 12/1985 | McDonald | 358/243 |
| 4,587,566 | 5/1986 | Hinn | 358/242 |
| 4,660,093 | 4/1987 | Craig et al. | 358/243 |
| 4,675,547 | 6/1987 | Eichenwald | 307/268 X |
| 4,748,497 | 5/1988 | Sengoku | 358/29 |
| 4,894,725 | 1/1990 | Sendelweck | 358/243 |

Primary Examiner—James J. Groody
Assistant Examiner—Safet Metjahic
Attorney, Agent, or Firm—Joseph S. Tripoli; Peter M. Emanuel; Richard G. Coalter

[57] ABSTRACT

A receiver includes a kinescope, a driver amplifier and an integrated automatic kinescope bias (AKB) circuit. A soft start circuit includes a timing capacitor, external to the integrated circuit, and a control circuit within the integrated circuit which limits the AKB current adjustment range during turn-on to a time determined by the external capacitor. The capacitor is effectively isolated from the integrated circuit to prevent discharge thereof by protection diodes of the IC whereby the time constant of the overall AKB circuit is substantially the same for both hot start conditions and cold start conditions thereby avoiding undesirable visual start-up artifacts such as black level and contrast shifts during warm-up of the kinescope for either a cold start condition or a hot start condition.

4 Claims, 1 Drawing Sheet

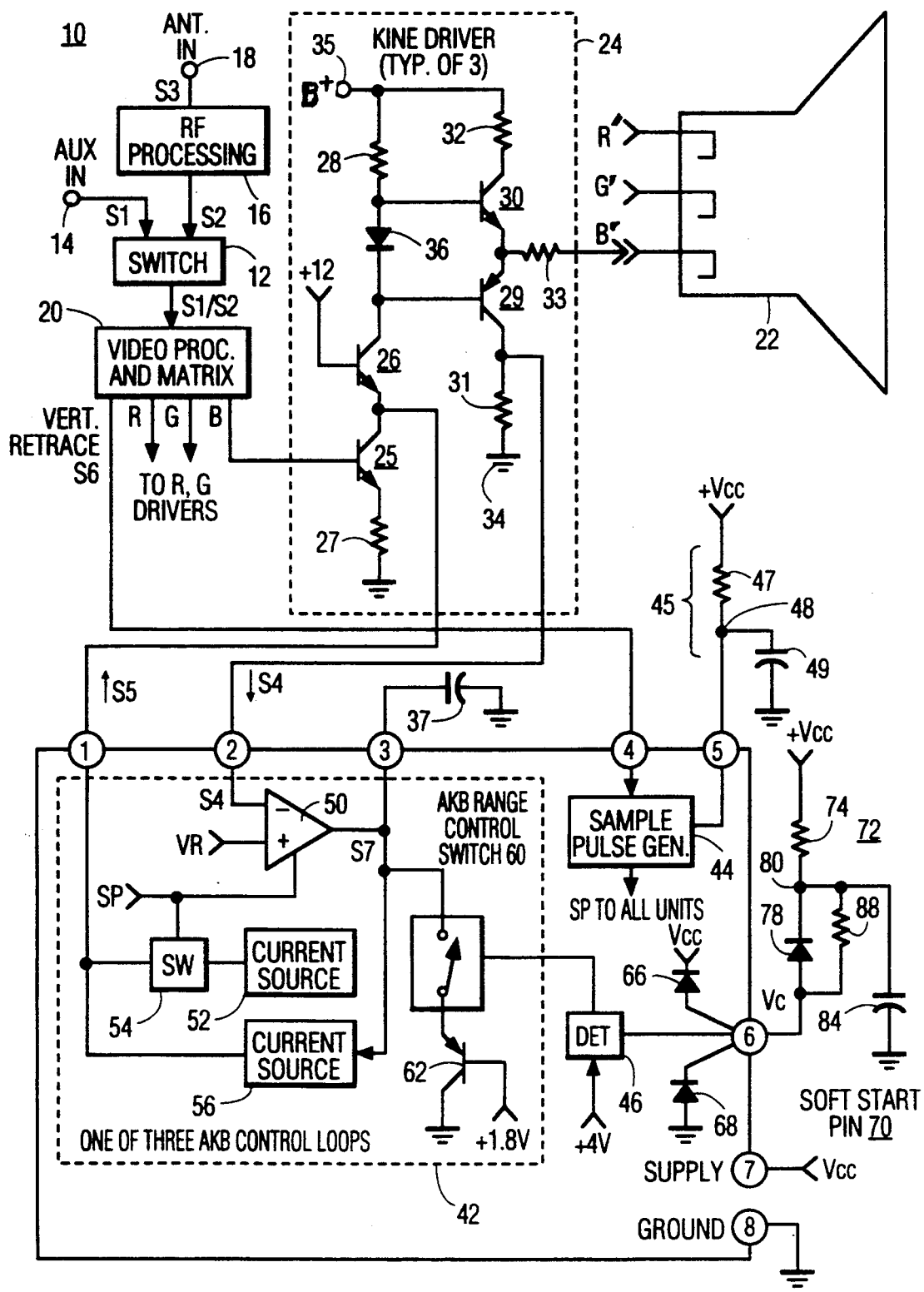

AKB APPARATUS WITH HOT START FLASH PREVENTION

FIELD OF THE INVENTION

This invention relates to an automatic kinescope bias (AKB) arrangement for use in a television system such as a television receiver or video monitor.

BACKGROUND OF THE INVENTION

Television receivers and monitors sometimes employ an automatic kinescope bias (hereafter, AKB) control system for automatically establishing proper black image representative current levels for each electron gun of the kinescope. As a result of this operation, pictures reproduced by the kinescope are prevented from being adversely affected by variations of kinescope operating parameters which may be caused, for example, by component aging or by component sensitivity to changes in temperature.

A conventional AKB control system includes a current sampling resistor in a kinescope cathode driver amplifier which is coupled to a control amplifier in an AKB feedback control loop for automatically adjusting the kinescope black level. Generally, this is done by sampling the kinescope drive level during a retrace interval, comparing the sample with a reference level and applying a correction current to the driver amplifier in a sense to adjust the black level to a desired reference value.

SUMMARY OF THE INVENTION

The present invention resides, in part, in the discovery that in certain circumstances it may be desirable to defeat or partially defeat the AKB operation. As an example, when a television receiver or monitor is first turned on the AKB system may tend to accentuate the kinescope drive current. Under such a "cold start" condition it would be desirable to defeat or partially defeat the AKB system until the kinescope cathodes reach their proper operating temperature.

For the "cold start" condition, one might consider the addition of a timing circuit to the AKB circuit to delay or otherwise modify the AKB operation for a fixed time period after the application of power to the television receiver or monitor. It has been found, however, that the delay which is needed during a "cold start" condition is undesirable during a "hot start" condition. As used herein a "hot start" condition is one in which a receiver or monitor, which has been operating for a period of time, is rapidly switched off and back on. Without correction for this condition, the AKB system may bias the kinescope at an undesirable level creating a so-called "hot flash" of kinescope brightness. For this case it would be desirable that the AKB simply "ignore" the rapid power cycling and not make any adjustments to the kinescope bias current. An even more desirable AKB soft start operation for the "hot start" condition, would be to modify the AKB operation for a period of time that is related, generally, to the time between turn-off and turn-on. This will be discussed in more detail later.

In addition to the foregoing, yet another problem has been found in implementing the "hot start" and "cold start" corrections noted above. Specifically, it has been found that for the specific case where the AKB circuit is implemented as an integrated circuit and where the timing is controlled by an RC network external to the integrated circuit, that the timing which is effective for the "cold start" condition may be undesirably defeated for purposes of the "hot start" condition. Specifically, it has been found that the integrated circuit protection network which provides voltage protection at the integrated circuit pins, can interfere with the proper operation of the RC timing network by introducing an undesired capacitor discharge path and thus making the "hot start" timing much shorter than the "cold start" timing.

AKB apparatus, embodying the invention, comprises an AKB control loop formed in an integrated circuit and including a first pin for connection to a current sensing resistor in said kinescope driver amplifier, having a second pin for supplying an AKB correction current to the kinescope driver amplifier and having a third pin for connection to a loop integration capacitor external to said integrated circuit. An AKB range control switch is formed in the integrated circuit and coupled to a point in the control loop for controlling the maximum value of said AKB correction current. A threshold detector is formed in said integrated circuit for controlling the range control switch, the threshold detector having an input coupled to a fourth pin of the integrated circuit. A soft start timing network, external to the integrated circuit, is connected to the fourth pin and includes an RC network and a diode for coupling the RC network to the fourth pin of said integrated circuit.

BRIEF DESCRIPTION OF THE DRAWING

The foregoing and further features of the invention are illustrated in the accompanying drawing wherein the sole FIGURE is a block diagram, partially in schematic form, of a television receiver/monitor with AKB apparatus embodying the invention.

DETAILED DESCRIPTION

The television receiver 10 of the sole FIGURE includes a switch 12 for selecting a baseband video signal S1 provided by an auxiliary input terminal 14 or a baseband video signal S2 provided by an RF (radio frequency) processing unit 16 having an antenna input terminal 18. Unit 16 may be of conventional design including, for example, a tuner, IF amplifier and video detector for converting the RF input signal S3 applied to terminal 18 to baseband form. The video signal (S1 or S2) selected by switch 12 is applied to a video processing and matrix unit 20 which produces component video signals RGB and a vertical retrace timing signal S6. Unit 20 may be of conventional design and may include, illustratively, color demodulation circuitry and control circuitry for hue, tint, brightness, as well as a matrix for generating the component color signals R (red), B (blue) and G (green).

The RGB color signals are applied to respective cathodes of a kinescope 22 for display by means of respective kinescope driver amplifiers. To simplify the drawing, only one kinescope driver amplifier (24) is illustrated. The kinescope 22 may be either of the direct view type having three cathodes within one tube (as shown) or it may be of the projection type which employs three separate kinescopes and an optical system for combining the respective images for display.

Kinescope driver amplifier 24 is of conventional design and includes a cascode connection of a common emitter connected input transistor 25 and a common base connected output transistor 26. The emitter of transistor 25 is coupled to ground via an emitter resistor 27 that, in combination with the load resistor 28 of transistor 26 determines the amplifier gain. A complementary PNP/NPN buffer amplifier couples the output signal of transistor 26 to the cathode of kinescope 22. Specifically, the conduction paths of PNP transistor 29 and NPN transistor 30 are coupled in series between ground 34 and B+ supply terminal 35. Resistors 31 and 32 in the collector circuits of transistors 29 and 30, respectively, provide current limiting. Resistor 31 additionally serves, for AKB purposes as a current sensing resistor as will be explained. To reduce cross-over distortion, a diode 36 is interposed between load resistor 28 and the collector of output transistor 26 to generate a 1 Vbe offset voltage between the bases of the complementary output transistors 29 and 30. This is not necessary, of course, of the output driver is "single-ended" rather than being of the "push-pull" or complementary emitter follower type as shown. Arc-over protection is provided by a resistor 33 coupled between the emitters of transistors 29 and 30 and the blue (B) cathode of kinescope 22. Additional protection may be provided by spark gaps if desired.

The current sensing resistor 31 is coupled to supply current samples S4 to an input pin 2 of an AKB integrated circuit 40 having an output pin 1 coupled to supply a correction current S5 to the emitter of the output transistor 26 of the kinescope driver amplifier 24 for adjusting the black level of the component signal B' supplied to the cathode of kinescope 22.

AKB integrated circuit 40 (outlined by a solid line) includes three AKB control loops (a typical one, 42, of which is outlined in phantom), a sample pulse generator 44 and a threshold detector 46. To simplify the drawing, only one (42) of the control loops is shown. The other control loops are identical to loop 42 and are coupled to the respective red (R) and blue (B) kinescope driver amplifiers in the same manner as loop 42 is coupled to driver amplifier 24. The AKB control loop 42 comprises a keyed comparator amplifier 50 coupled to compare the current sample signal S4 with a reference voltage Vr for controlling a current source 56 that is coupled to pin 1 for supplying the correction current S5 to driver amplifier 24. Current adjustments are made during the vertical blanking interval of the video signal S1 (or S2) by means of the sample pulse generator 44 in combination with a further current source 52 and a switch 54. Specifically, in response to the vertical retrace signal S6 applied via IC pin 4 to sample pulse generator 44, the generator produces a sample pulse SP at the end of the vertical retrace period. The SP closes switch 54 thereby applying a sample reference current produced by current source 52 to the driver amplifier 24. This sample pulse represents a reference drive current and is used to determine the actual drive current to the kinescope. Sampling is done during the vertical interval at the end of the vertical retrace period in order to avoid interference from active (picture representative) video signals.

Timing for sample pulse generator 44 is supplied by an external RC circuit 45 comprising a resistor 47 and a capacitor 49 which are coupled between a source of supply voltage +Vcc and a point of reference potential (ground) with the common connection (i.e., circuit node 48) of resistor 47 and capacitor 49 being coupled to the timing input of pulse generator 44 via integrated circuit pin 5. Amplifier 50, keyed by the sample pulse SP, determines if the kinescope cathode current S4 is above or below the value corresponding to reference voltage Vr and supplies a control signal S7 to current source 56 in a sense to adjust the kinescope black level to the desired level. The control signal (a voltage) S7 is smoothed by means of an integration capacitor 57 coupled to the output of amplifier 50 via integrated circuit pin 3.

To briefly summarize the operation of the AKB control loop described thus far, the control loop 42 in integrated circuit 40 will reach an equilibrium or "steady-state" condition in which the correction current S5 supplied to driver amplifier 24 will be just sufficient to maintain the black level drive for kinescope 22 at a level determined to the reference voltage Vr applied to the amplifier 50. The feedback in this control loop is negative and so counteracts any tendency for an undesired change in the black level which may be due, for example, to component aging or to temperature variations.

The remaining elements of the AKB system in the receiver of the sole FIGURE provide soft cold start and soft hot start AKB loop control in accordance with the invention. These elements include an AKB range control switch (60) formed in the integrated circuit 40 and coupled to a point (e.g., pin 3, the output of amplifier 50) in the control loop for controlling the maximum value of the AKB correction current provided by current source 56. This is implemented by connecting switch 60 between a reference voltage source (comprising clamp transistor 62) and the output of amplifier 50. The switch 60, when closed limits the magnitude of the correction current of source 56 to about half of its maximum value and when open enables dynamic operation over the complete current control range.

Control of switch 60 is provided by threshold detector 46 which is formed in the integrated circuit 40. The detector 46 has an input coupled to a fourth pin (6) of the integrated circuit 40. This IC pin, being on the integrated circuit, is provided with protection diodes 66 and 68 coupling pin 6 to supply 7 (+Vcc) and ground (8) terminals of the integrated circuit. Pin 6 receives a control voltage Vc which the detector compares with a reference voltage (e.g., +4.0 volts) for controlling the range control switch 60. A soft start timing network 72 (external to the IC 40) is connected to pin (6) for producing the control voltage Vc. Network 72 is an RC network comprising a node 80, a resistor 74 coupled between node 80 and a first source of potential (+Vcc) and a capacitor 84 coupled between node 80 and a second source of potential (e.g., ground, as shown). Node 80 is coupled to soft start pin 6 via a diode 78 connected at the cathode thereof to node 80 and at the anode thereof to integrated circuit (IC) pin 6.

A source of "pull up" current is also applied to pin 6. In this example of the invention this is provided by resistor 88 connected in parallel with diode 78. Alternatively, resistor 88 may be coupled between pin 6 and any suitable source of supply voltage and may be internal to the IC 40 or external to it. The value of resistor 88 is not critical but should be substantially greater than the RC time constant of network 72 so as to not interfere with the network timing. Exemplary values of resistor 88, resistor 74 and capacitor 84 are: 1 meg-Ohms, 180 k-Ohms and 100 micro-Farads. The RC timing values are selected to be about equal to the warm-up time of the kinescope (e.g., about 8–10 seconds, typically). The pull-up resistor value is selected to be substantially greater than the timing resistor value.

Operation of the overall system will be illustrated by the following specific examples of static and dynamic conditions. First, for the steady state condition previously described capacitor 84 will be charged to a voltage (+Vcc) greater than the 4 volt threshold of detector 46 whereby switch 60 will be open. In this steady state condition, the soft start circuitry (72, 46, 60, 62) will have no effect on operation of the AKB control loop 42 since it will be effectively disconnected (by switch 60 being open) from the control loop. Accordingly, loop 42 will regulate the kinescope black level current as previously described.

Now consider the operation for the case where the receiver 10 has been turned off for a period of time long compared with the discharge time constant of network 72 (i.e., the RC product of elements 74 and 84). For this case, when power is applied to the system, the uncharged condition of capacitor 84 will be detected by detector 46 since the capacitor voltage (zero) will be less than the detector reference voltage of +4 volts. Thus, switch 60 will be closed thereby limiting the maximum value of the correction current provided by current source 56 to about one-half of its full value. This slow turn on as the kinescope warms up prevents over correcting the cathode drive current to the kinescope 22. To reiterate, upon a "cold start" condition, the control voltage Vc produced by the external timing circuit 72 will initially be less than 4 volts thereby enabling detector 64 to close switch 60 and limiting the dynamic adjustment range of the AKB loop 42 to about ½ of its normal range. When Vc is greater than 4 volts, full dynamic range is available whereby during warm-up excessive drive current is prevented and undesirable visual artifacts are avoided.

Now consider the operation under hot start conditions. When the receiver 10 is turned off, the supply voltage Vcc drops to zero in a few milliseconds. In the absence of diode 78, the timing capacitor 84 would discharge quickly through the integrated circuit protection diode 66. In other words, but for the presence of diode 78, the discharge time constant of capacitor 84 would be extremely small as compared to its charging time constant. If the receiver were to then be turned on immediately after having been turned off the kinescope will still be warm and beam current will immediately be available. However, without diode 78, capacitor 84 would take 8 to 10 seconds to charge and so the full dynamic adjustment range will not be available during this period. This would be undesirable because the steady state operating point of the kinescope gun may be outside the range desired. For example, the normal dynamic adjustment current range may be, for example, in the range of 0 to 7 mA. When Vc is below the threshold of detector 46, the dynamic range is limited to 3.5 mA, illustratively. However, if one gun has a steady state adjustment current of 6 mA, then that gun will not reach steady state until after the 8-10 seconds required to charge the timing capacitor 84. As a result, the kinescope white balance and black level will be wrong for the 8-10 second period until capacitor 84 charges to the reference level applied to detector 64.

The foregoing problem in hot start operation is prevented, in the system of the sole FIGURE, by means of diode 78 which is placed in series with the soft start pin 6 as illustrated. As a result, when the receiver/monitor 10 is turned off (+Vcc goes to ground) the external series diode 78 is reverse biased thereby preventing discharge of the capacitor to ground via the protection diode of the integrated circuit. Accordingly, for the hot start condition, the capacitor voltage will decay with the same time constant as with which it was charged for the cold start case. In other words, diode 78 ensures that similar time constants apply for both hot and cold starts by preventing immediate discharge of the timing capacitor 84 through the IC protection diode 66 upon turn-off of the receiver. Advantageously, this prevents undesirable disturbance of the white balance and black level which otherwise would occur for the example discussed above.

What is claimed is:

1. AKB apparatus, for use with a kinescope driver amplifier, comprising:

an AKB control loop formed in an integrated circuit and including a first pin for connection to a current sensing resistor in said kinescope driver amplifier, having a second pin for supplying an AKB correction current to said kinescope driver amplifier and having a third pin for connection to a loop integration capacitor external to said integrated circuit;

an AKB range control switch formed in said integrated circuit and coupled to a point in said control loop for controlling the maximum value of said AKB correction current;

a threshold detector formed in said integrated circuit for controlling said range control switch, said detector having an input coupled to a fourth pin of said integrated circuit; and a soft start timing network, connected to said fourth pin and external to said integrated circuit, and including an RC network and a diode for coupling said network to said fourth pin of said integrated circuit.

2. AKB apparatus as recited in claim 1 wherein said RC network comprises a circuit node coupled to a first source of potential via a resistor and coupled to a second source of potential via a capacitor; and wherein said diode is coupled at the anode thereof to said fourth pin of said integrated circuit and at the cathode thereof to said node of said RC network.

3. AKB apparatus as recited in claim 1 wherein said soft start timing network comprises:

a circuit node;

a resistor coupled between said circuit node and a first source of potential;

a capacitor coupled between said circuit node and a second source of potential; and wherein said diode is coupled between said fourth pin of said integrated circuit and said circuit node, said diode being poled in a sense to prevent discharge of said capacitor into said fourth pin of said integrated circuit upon termination of supply voltage to a supply pin of said integrated circuit.

4. AKB apparatus as recited in claim 3 wherein said diode is coupled at the anode thereof to said fourth pin of said integrated circuit and at the cathode thereof to said circuit node of said soft start timing circuit.

* * * * *